US012259110B1

(12) United States Patent
Hsieh et al.

(10) Patent No.: US 12,259,110 B1
(45) Date of Patent: Mar. 25, 2025

(54) OPTICAL PACKAGING STRUCTURE AND BACKLIGHT MODULE HAVING THE SAME

(71) Applicant: ADVANCED OPTOELECTRONIC TECHNOLOGY, INC., Hsinchu County (TW)

(72) Inventors: Chuang-Yu Hsieh, Hsinchu (TW); Hsin-Ting Hung, Hsinchu (TW); Hao-Hsiang Hsieh, Hsinchu (TW); Shih-Hsiang Lo, Hsinchu (TW)

(73) Assignee: ADVANCED OPTOELECTRONIC TECHNOLOGY, INC., Hsinchu County (TW)

( * ) Notice: Subject to any disclaimer, the term of this patent is extended or adjusted under 35 U.S.C. 154(b) by 0 days.

(21) Appl. No.: 18/808,295

(22) Filed: Aug. 19, 2024

(30) Foreign Application Priority Data

Mar. 8, 2024 (CN) ........................ 202420468338.9

(51) Int. Cl.

| | |
|---|---|
| ***F21V 15/01*** | (2006.01) |
| ***F21V 5/04*** | (2006.01) |
| ***F21V 7/00*** | (2006.01) |
| ***F21V 9/30*** | (2018.01) |
| ***F21Y 113/00*** | (2016.01) |

(52) U.S. Cl.
CPC ................ *F21V 15/01* (2013.01); *F21V 5/04* (2013.01); *F21V 7/0066* (2013.01); *F21V 9/30* (2018.02); *F21Y 2113/00* (2013.01)

(58) Field of Classification Search
CPC ............ F21V 5/04–048; F21V 7/0066; F21V 9/30–38; F21V 15/01–015; F21Y 2113/00–17; G02F 1/133602–133614; H10H 20/80–882
See application file for complete search history.

(56) References Cited

U.S. PATENT DOCUMENTS 12,191,428 B2 * 1/2025 Park .................... H10H 20/852

* cited by examiner

*Primary Examiner* — Jason M Han
(74) *Attorney, Agent, or Firm* — ScienBiziP, P.C.

(57) ABSTRACT

The present disclosure provides an optical packaging structure and a backlight module with the optical packaging structure. The optical packaging structure includes a light-emitting chip, a packaging layer, a fluorescent layer, a lens structure, and a reflecting layer. The light-emitting chip includes a light-emitting surface, a connecting surface, and a side surface. The packaging layer covers the light-emitting surface and the first side surface. The connecting surface is exposed from the packaging layer. The fluorescent layer is disposed on the packaging layer, and covers on the light-emitting surface and the first side surface. The lens structure is disposed on a top surface of the fluorescent layer. A surface of the lens structure is recessed towards the light-emitting chip to form a curved surface. The reflecting layer is disposed on the curved surface.

20 Claims, 4 Drawing Sheets

OPTICAL PACKAGING STRUCTURE AND BACKLIGHT MODULE HAVING THE SAME

FIELD

The subject matter relates to optical packaging, and more particularly, to an optical packaging structure and a backlight module having the optical packaging structure.

BACKGROUND

A backlight may include a chip scale package (CSP) or a near chip scale package (NCSP) structure. Such package structure may have a number of LEDs for emitting light.

However, the light emission angle of the package structure may not meet the requirements, resulting in a poor light output effect, and a size of the package structure may be large.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
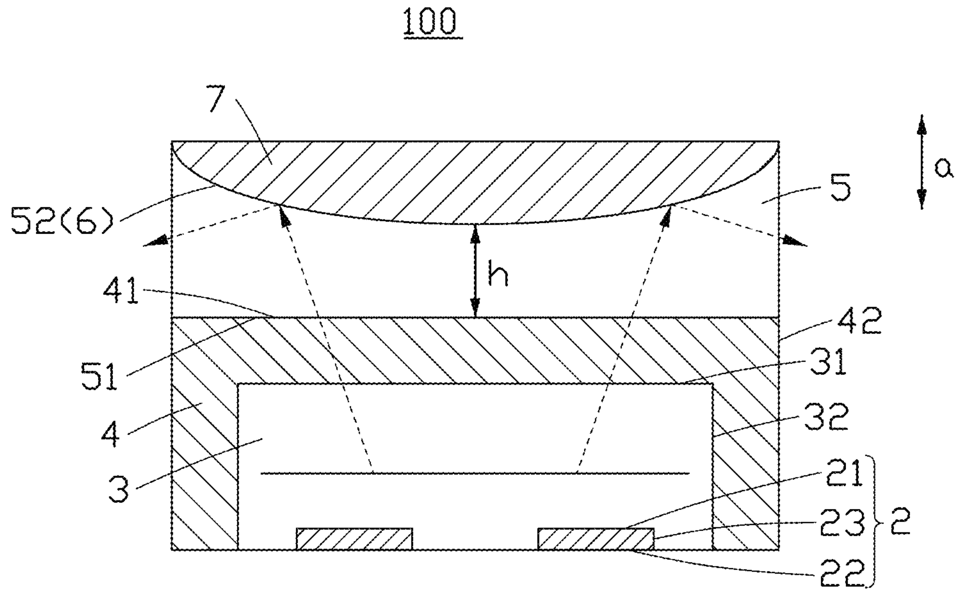
FIG. 1 is a diagrammatic view of an optical packaging structure according to an embodiment of the present disclosure.

It will be appreciated that for simplicity and clarity of illustration, where appropriate, reference numerals have been repeated among the different FIG.s to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, an optical packaging structure 100 is provided according to an embodiment of the present disclosure. The optical packaging structure 100 includes at least one light-emitting chip 2, a packaging layer 3, a fluorescent layer 4, a lens structure 5, and a reflecting layer 7. The light-emitting chip 2 includes a light-emitting surface 21, a connecting surface 22 opposite to the light-emitting surface 21, and a first side surface 23 connected to the light-emitting surface 21 and the connecting surface 22. The light-emitting chip 2 emits light from the light-emitting surface 21. The packaging layer 3 covers the light-emitting surface 21 and the first side surface 23 of the light-emitting chip 2. The packaging layer 3 includes a first top surface 31 facing the light-emitting surface 21 and a second side surface 32 facing the first side surface 23. The connecting surface 22 is exposed from the packaging layer 3 to facilitate electrical connection between the connecting surface 22 and a circuit board (not shown). The fluorescent layer 4 is disposed on the first top surface 31 and the second side surface 32 of the packaging layer 3. The fluorescent layer 4 includes a second top surface 41 spaced from and facing the first top surface 31. The fluorescent layer 4 covers the packaging layer 3 and the light-emitting chip 2. The lens structure 5 is disposed on the second top surface 41 of the fluorescent layer 4 and above the light-emitting surface 21. The lens structure 5 includes a third top surface 52 spaced from and facing the second surface, the third top surface 52 being recessed towards the light-emitting chip 2 to form a curved surface 6. The reflecting layer 7 is disposed on the curved surface 6. The lens structure 5 has a certain refractive index. The lens structure 5 and the reflecting layer 7 can cooperatively reflect the light from the light-emitting chip 2 and change a travelling direction of the light, while the curved surface 6 can effectively increase a light-emitting angle to improve an optical effect of the optical packaging structure 100. As such, the optical packaging structure 100 can emit light to the ambient environment from each sidewall of the optical packaging structure 100. Furthermore, the lens structure 5 and the reflecting layer 7 are located on the top second surface 41 of the fluorescent layer 4, which is beneficial for reducing a size of the optical packaging structure 100 compared to a related art that covering an entire light-emitting chip with a lens.

The light-emitting chip 2 is a LED chip. The light-emitting chip 2 may be, but is not limited to, a flip-chip structure. The light-emitting chip 2 with the flip-chip structure can be soldered on the circuit board of a backlight module through eutectic soldering technology. Thus, the installation of the optical packaging structure 100 in the backlight module is easily and simply. The production costs can be reduced. Furthermore, the size of the optical packaging structure 100 can be reduced, which can provide greater power with a same packaging size.

In a direction perpendicular to the light emitting surface 21, an orthogonal projection of the lens structure 5 on the light emitting surface 21 covers the light emitting surface 21. Thus, the light emitted by the light-emitting chip 2 from the light emitting surface 21 can almost be completely transmitted into the lens structure 5. Thus, the light emitted by the light-emitting chip 2 in a vertical direction (defined as "a") is fully reflected to reduce a light intensity in the vertical direction. Furthermore, the light emitted in the vertical direction is reflected to a side of the optical packaging structure 100 to enlarge the light emission angle.

In an embodiment, a projection of the curved surface 6 along the direction perpendicular to the light emitting surface 21 covers the light emitting surface 21. Thus, the reflecting layer 7 can entirely cover the curved surface 6.

In an embodiment, the lens structure 5 further includes a bottom surface 51 opposite to the third top surface 52. The first surface 51 is close to the light-emitting chip 2. The first surface 51 is a plane, that is, the second top surface 41 of the fluorescent layer 4 in contact with the lens structure 5 is a plane. The third top surface 52 is recessed towards the bottom surface 51 to form the curved surface 6. The bottom surface 51 of the lens structure 5 is a plane. In other words, the bottom surface 51 is a place with no curvatures. The bottom surface 51 can fully refract the light emitted from the light-emitting chip 2 and conduct the light to the lens structure 5 with a curved surface 6. Thus, the light in the vertical direction of the light-emitting chip 2 can be reflected to the sidewalls of the optical packaging structure 100 sufficiently, thereby reducing the light intensity in the vertical direction.

In an embodiment, the optical packaging structure 100 is substantially a cubic structure. The packaging layer 3 and the fluorescent layer 4 are also cubic structures. The lens structure 5 is located on the top of the fluorescent layer 4. A third side surface 42 of the fluorescent layer 4 can be a vertical surface or a curved surface with a small curvature, which is beneficial for further reducing the size of the optical packaging structure 100 and improving a packaging density of the optical packaging structure 100 in the backlight module.

Referring to FIG. 1, the curved surface 6 is located on the entire third top surface 52 of the lens structure 5, so that a projection of the curved surface 6 along the direction perpendicular to the light emitting surface 21 covers the light emitting surface 21. The reflecting layer 7 entirely covers the curved surface 6. Thus, the light refracted from the third top surface 52 in the lens structure 5 can be reflected by the reflecting layer 7, and due to the curved surface 6, and the light emission angle can be significantly increased to enlarge a light emission range and improve light efficiency.

In an embodiment, the curved surface 6 is a concave surface that is concave towards the third top surface 52, which is conducive to enlarge the light emission angle of the light reflected by the reflecting layer 7.

In an embodiment, a curvature of the curved surface 6 gradually decreases from a periphery of the curved surface 6 to a middle of the curved surface 6, which is beneficial for evenly reflecting the light in the middle and periphery of the light-emitting chip 2 at a large angle.

In an embodiment, the curved surface 6 may be, but not limited to, a spherical surface, a quasi-spherical surface, an ellipsoidal surface, a quasi-ellipsoidal surface, or an irregular concave surface.

Figure 2:
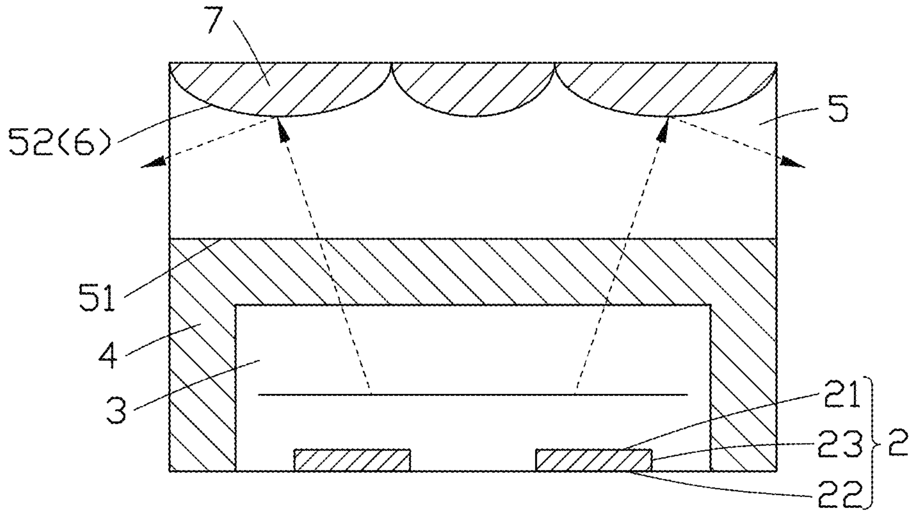
FIG. 2 is a diagrammatic view of an optical packaging structure according to another embodiment of the present disclosure.

In another embodiment, referring to FIG. 2, the curved surface 6 may be a wavy surface and include multiple concave surfaces. Thus, the curved surface 6 and the reflecting layer 7 can cooperatively reflect the light in the vertical direction in multiple directions, which not only increases the angle of reflected light, but also improves the uniformity of reflected light.

In an embodiment, a distance (defined as “h”) between a lowest point of the curved surface 6 is spaced from and the bottom surface 51, the distance “h” is greater than zero. Thus, the curved surface 6 does not directly reflect the light emitted by the fluorescent layer 4. That is, all light emitted from the fluorescent layer 4 first enters the lens structure 5 and is subjected to a certain degree of refraction, and then the light is reflected by the reflecting layer 7 on the curved surface 6. Thus, the light in the vertical direction can travel to the sidewalls of optical packaging structure 100, thereby preventing a portion of the light from travelling along its original path, which is beneficial for further enlarging the angle of reflected light.

In an embodiment, the projection of the lens structure 5 along the direction perpendicular to the light emitting surface 21 covers the light emitting surface 21, which can fully refract the light emitted from the light emitting surface 21. Thus, the light efficiency of the optical packaging structure 100 is further improved.

In an embodiment, a plurality of light-emitting chips 2 are arranged in the packaging layer 3. The projection of the curved surface 6 along the direction perpendicular to the light-emitting surface 21 covers the light-emitting surface 21 of each of the light-emitting chips 2. By encapsulating the plurality of light-emitting chips 2 together in the packaging layer 3, the density of the light-emitting chips 2 can be increased, the optical effect can be improved, and the number of optical packaging structures 100 in the backlight module can be reduced.

Figure 3:
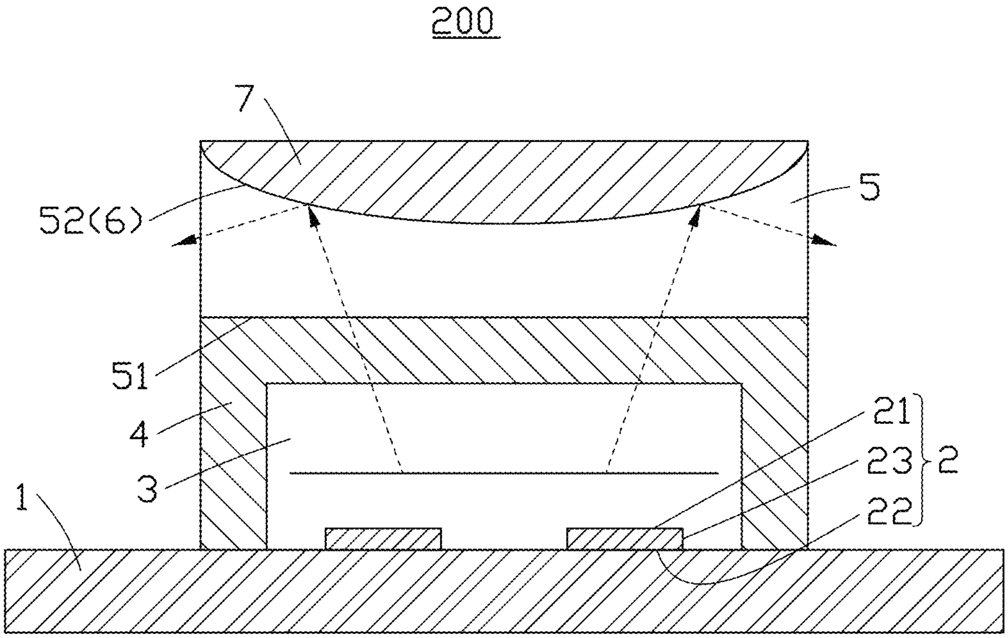
FIG. 3 is a diagrammatic view of an optical packaging structure according to yet another embodiment of the present disclosure.

Referring to FIG. 3, an optical packaging structure 200 is provided according to another embodiment of the present disclosure. The structure of the optical packaging structure 200 is substantially same as that of the optical packaging structure 100, except that the optical packaging structure 200 further includes a substrate 1. The light-emitting chip 2 is flip-chip connected to the substrate 1. The connecting surface 22 of the light-emitting chip 2 is electrically connected to pads of the substrate 1. The substrate 1 is further in contact with the packaging layer 3 and the fluorescent layer 4, thereby sealing the light-emitting chip 2.

The light-emitting chip 2 is a flip-chip structure. The flip-chip light-emitting chip 2 can be soldered on the substrate 1 through eutectic soldering technology. Compared to CSP packaging structure, the optical packaging structure 200 with the substrate 1 is a NCSP structure, which facilitates the packaging of the light-emitting chip 2 and the miniaturization of the optical packaging structure 200.

With the above configuration, in the optical packaging structure 100 (200), the lens structure 5 with the curved surface 6 is disposed on the top of the fluorescent layer 4, and the reflecting layer 7 is disposed on the curved surface 6. The light is refracted by the lens structure 5 and reflected by the reflecting layer 7 on the curved surface 6, which can enlarge the light emission angle to direct the light in the vertical direction to the sidewalls of the optical packaging structure 100 (200). Thus, the optical effect of the optical packaging structure 100 is improved. Furthermore, the lens structure 5 is only disposed on the top of the fluorescent layer 4, thereby reducing the volume of the optical packaging structure 100 (200).

Figure 4:
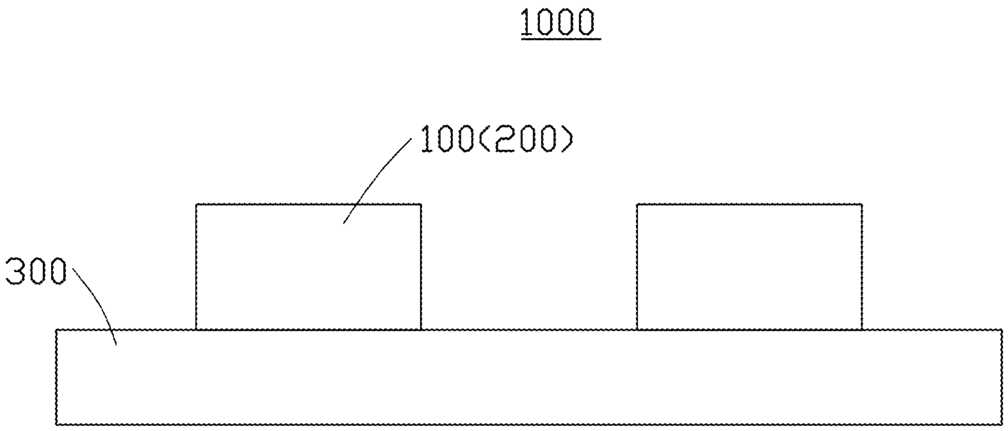
FIG. 4 is a diagrammatic view of a backlight module according to an embodiment of the present disclosure.

Referring to FIG. 4, a backlight module 1000 is also provided according to an embodiment of the present disclosure. The backlight module 1000 includes a circuit board 300 and at least one optical packaging structure 100 (200) disposed on the circuit board 300. The connecting surface 22 of the optical packaging structure 100 is electrically connected to the circuit board 300. The optical packaging structure 200 is electrically connected to the circuit board 300 through the substrate 1.

The optical packaging structure 100 (200) is beneficial to improving the light-emitting effect of the backlight module 1000, while also reducing the number of optical packaging structures 100 (200) on the backlight module 1000.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An optical packaging structure comprising:

at least one light-emitting chip comprising a light-emitting surface, a connecting surface opposite to the light-emitting surface, and a first side surface connected to the light-emitting surface and the connecting surface;

a packaging layer comprising a first top surface and a second side surface, wherein the packaging layer covers the light-emitting surface and the first side surface of the at least one light-emitting chip and exposes the connecting surface, the first top surface faces the light-emitting surface, and the second side surface faces the first side surface;

a fluorescent layer covering the first top surface and the second side surface, the fluorescent layer comprising a second top surface spaced from and facing the first top surface;

a lens structure disposed on the second top surface, the lens structure comprising a third top surface spaced from and facing the second top surface, and a curved surface on the third top surface by recessing the third top surface towards the at least one light-emitting chip; and a reflecting layer disposed on the curved surface.

2. The optical packaging structure according to claim 1, wherein in a direction perpendicular to the light emitting surface, an orthogonal projection of the lens structure on the light emitting surface covers the light emitting surface.

3. The optical packaging structure according to claim 2, wherein an orthogonal projection of the curved surface along the direction perpendicular to the light emitting surface covers the light emitting surface, and the reflecting layer entirely covers the curved surface.

4. The optical packaging structure according to claim 3, wherein the lens structure further comprises a bottom surface opposite to the third top surface, and the bottom surface is a plane.

5. The optical packaging structure according to claim 1, wherein the curved surface is a wavy surface and comprises multiple concave surfaces.

6. The optical packaging structure according to claim 1, wherein a curvature of the curved surface decreases from a periphery of the curved surface to a middle of the curved surface.

7. The optical packaging structure according to claim 6, wherein the curved surface is a spherical surface, a quasi-spherical surface, an ellipsoidal surface, or a quasi-ellipsoidal surface.

8. The optical packaging structure according to claim 4, wherein a lowest point of the curved surface is spaced from the bottom surface.

9. The optical packaging structure according to claim 3, comprising a plurality of light-emitting chips, the orthogonal projection of the curved surface along the direction perpendicular to the light emitting surface of a corresponding one of the plurality of the light-emitting chips covers the light-emitting surface of the corresponding light-emitting chip.

10. The optical packaging structure according to claim 1, further comprising a substrate, wherein the at least one light-emitting chip is flip-chip connected to the substrate.

11. A backlight module comprising:

a circuit board; and at least one optical packaging structure disposed on the circuit board, each of the at least one optical packaging structure comprising:

at least one light-emitting chip comprising a light-emitting surface, a connecting surface opposite to the light-emitting surface, and a first side surface connected to the light-emitting surface and the connecting surface;

a packaging layer comprising a first top surface and a second side surface, wherein the packaging layer covers the light-emitting surface and the first side surface of the at least one light-emitting chip and exposes the connecting surface, the first top surface faces the light-emitting surface, and the second side surface faces the first side surface;

a fluorescent layer covering the first top surface and the second side surface, the fluorescent layer comprising a second top surface spaced from and facing the first top surface;

a lens structure disposed on the second top surface, the lens structure comprising a third top surface spaced from and facing the second top surface, and a curved surface on the third top surface by recessing the third top surface towards the at least one light-emitting chip; and a reflecting layer disposed on the curved surface.

12. The backlight module according to claim 11, wherein in a direction perpendicular to the light emitting surface, an orthogonal projection of the lens structure on the light emitting surface covers the light emitting surface.

13. The backlight module according to claim 12, wherein an orthogonal projection of the curved surface along the direction perpendicular to the light emitting surface covers the light emitting surface, and the reflecting layer entirely covers the curved surface.

14. The backlight module according to claim 13, wherein the lens structure further comprises a bottom surface opposite to the third top surface, and the bottom surface is a plane.

15. The backlight module according to claim 11, wherein the curved surface is a wavy surface and comprises multiple concave surfaces.

16. The backlight module according to claim 11, wherein a curvature of the curved surface decreases from a periphery of the curved surface to a middle of the curved surface.

17. The backlight module according to claim 16, wherein the curved surface is a spherical surface, a quasi-spherical surface, an ellipsoidal surface, or a quasi-ellipsoidal surface.

18. The backlight module according to claim 14, wherein a lowest point of the curved surface is spaced from the bottom surface.

19. The backlight module according to claim 13, comprising a plurality of light-emitting chips, the orthogonal projection of the curved surface along the direction perpendicular to the light emitting surface of a corresponding one of the plurality of the light-emitting chips covers the light-emitting surface of the corresponding light-emitting chips.

20. The backlight module according to claim 11, further comprising a substrate, wherein the at least one light-emitting chip is flip-chip connected to the substrate.

* * * * *